(12) United States Patent
Kim

(10) Patent No.: US 9,663,107 B2
(45) Date of Patent: May 30, 2017

(54) LAUNCH CONTROL METHOD FOR VEHICLE WITH DRY-TYPE CLUTCH

(71) Applicants: Hyundai Motor Company, Seoul (KR); Kia Motors Corporation, Seoul (KR)

(72) Inventor: Jin Sung Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/050,936

(22) Filed: Feb. 23, 2016

(65) Prior Publication Data

US 2017/0096142 A1 Apr. 6, 2017

(30) Foreign Application Priority Data

Oct. 1, 2015 (KR) .................. 10-2015-0138553

(51) Int. Cl.
*G06F 17/00* (2006.01)
*B60W 30/18* (2012.01)
(Continued)

(52) U.S. Cl.
CPC ...... *B60W 30/18027* (2013.01); *B60W 10/02* (2013.01); *B60W 10/06* (2013.01); *B60W 2050/001* (2013.01); *B60W 2050/0011* (2013.01); *B60W 2510/0275* (2013.01); *B60W 2510/0657* (2013.01);
(Continued)

(58) Field of Classification Search
None
See application file for complete search history.

(56) References Cited

U.S. PATENT DOCUMENTS 5,123,302 A * 6/1992 Brown .................. F16H 61/061
477/154
5,213,012 A * 5/1993 Suzuki .............. F16H 61/66259
477/48
(Continued)

FOREIGN PATENT DOCUMENTS

JP 3536216 B2 6/2004
JP 2007-163306 A 6/2007
(Continued)

*Primary Examiner* — Dirk Wright
(74) *Attorney, Agent, or Firm* — Mintz Levin Cohn Ferris Glovsky and Popeo, P.C.; Peter F. Corless

(57) ABSTRACT

A launch control method for a vehicle with a dry-type clutch includes: determining a target engine speed corresponding to an operation amount of an accelerator pedal of the vehicle when vehicle launch is started by operation of the accelerator pedal; calculating a feedforward component which is part of the torque to control the clutch using a rate of change over time of the target engine speed and a current engine torque; calculating a feedback component which is part of the torque to control the clutch based on a difference between the target engine speed and the current engine speed; calculating a compensation torque using a current engine torque and an estimated clutch torque which is estimated to be currently transferred by the clutch; and controlling a clutch actuator to drive the clutch with a sum of the feedforward component, the feedback component, and the compensation torque.

7 Claims, 3 Drawing Sheets

(51) Int. Cl.
*B60W 10/02* (2006.01)
*B60W 10/06* (2006.01)
*B60W 50/00* (2006.01)

(52) U.S. Cl.
CPC . *B60W 2510/0695* (2013.01); *B60W 2540/10* (2013.01); *B60W 2710/022* (2013.01); *B60W 2710/0644* (2013.01); *B60Y 2300/18025* (2013.01)

(56) References Cited

U.S. PATENT DOCUMENTS

| | | | | |
|---|---|---|---|---|
| 5,439,428 | A | * | 8/1995 | Slicker .................... F16D 48/06 192/103 R |
| 8,744,705 | B2 | * | 6/2014 | Thor ........................ F16D 48/06 192/3.61 |
| 8,755,981 | B2 | * | 6/2014 | Williams ................ F16D 48/00 700/28 |
| 2013/0332038 | A1 | | 12/2013 | Williams et al. |

FOREIGN PATENT DOCUMENTS

| | | |
|---|---|---|
| JP | 2008-030560 A | 2/2008 |
| JP | 2008-298100 A | 12/2008 |
| JP | 2012-179955 A | 9/2012 |
| JP | 2014-088939 A | 5/2014 |
| KR | 2011-0051059 A | 5/2011 |

\* cited by examiner

LAUNCH CONTROL METHOD FOR VEHICLE WITH DRY-TYPE CLUTCH

CROSS REFERENCE TO RELATED APPLICATION

The present application claims the benefit of and priority to Korean Patent Application No. 10-2015-0138553, filed on Oct. 1, 2015, whereby the entire contents of which are incorporated herein for all purposes by reference.

BACKGROUND OF THE DISCLOSURE

Field of the Disclosure

The present disclosure relates generally to a launch control method for a vehicle equipped with an Automated Manual Transmission (AMT) or a Dual Clutch Transmission (DCT), and more particularly, to a technology launching a vehicle equipped with AMT or DCT including a dry-type clutch by controlling the clutch.

Description of the Related Art

For the purposes of the present disclosure, launch control refers to controlling a dry-type clutch in a situation in which a vehicle equipped with an AMT or DCT with the dry-type clutch is started or accelerated from stop or creep driving. The launch control, when an engine is controlled by operation of an accelerator pedal by a driver, synchronizes the speed of the input shaft of a transmission, which transfers driving force, with the speed of the engine by engaging the dry-type clutch.

The dry-type clutch is controlled by a map of a Torque-Stroke (T-S) curve, representing the characteristics of the transfer torque of the clutch as a function of the stroke of a clutch actuator. The T-S curve is changed relatively easily by various factors such as the temperature and number of operation of the clutch. Notably, compensating for such changes is difficult, and thus, errors occur in many cases.

For instance, in a case where excessive engagement of the clutch occurs due to an error in the T-S curve during launch control, because the engine is in a situation where an unexpected excessive load is applied, so stuttering or stalling of the engine may occur. Here, the expression "clutch", without any other particular limitation, indicates "dry-clutch".

The foregoing is intended merely to aid in the understanding of the background of the present disclosure, and is not intended to mean that the present disclosure falls within the purview of the related art that is already known to those skilled in the art.

SUMMARY OF THE DISCLOSURE

The present disclosure provides a launch control method for a vehicle with dry-type clutch that, in the case of launching a vehicle while engaging a dry-type clutch, even if an error occurs in the T-S curve, prevents stalling or stuttering of the engine by suitable clutch control and enables stable launch driving of the vehicle.

A launch control method for a vehicle with dry-type clutch according to embodiments of the present disclosure includes: determining, by a controller, a target engine speed corresponding to an operation amount of an accelerator pedal of the vehicle when vehicle launch is started by operation of the accelerator pedal; calculating, by the controller, a feedforward component which is part of the torque to control the clutch using a rate of change over time of the target engine speed and a current engine torque; calculating, by the controller, a feedback component which is part of the torque to control the clutch based on a difference between the target engine speed and the current engine speed; calculating, by the controller, a compensation torque using a current engine torque and an estimated clutch torque which is estimated to be currently transferred by the clutch; and controlling, by the controller, a clutch actuator to drive the clutch with a sum of the feedforward component, the feedback component, and the compensation torque.

The launch control method may further include calculating the feedforward component by subtracting a product of the rate of change over time of the target engine speed and a rotational moment of inertia of the engine from the current engine torque.

The launch control method may further include calculating a Proportional Integral Differential (PID) control value corresponding to a difference obtained by subtracting the target engine speed from the current engine speed as the feedback component.

The launch control method may further include calculating a Proportional Integral (PI) control value corresponding to a difference obtained by subtracting the estimated clutch torque from the current engine torque as the compensation torque.

The launch control method may further include calculating, by a torque observer, the estimated clutch torque according to the current engine speed and the current engine torque.

Furthermore, according to embodiments of the present disclosure, a launch control system includes: a vehicle with a dry-type clutch; and a controller configured to: determine a target engine speed corresponding to an operation amount of an accelerator pedal of the vehicle when vehicle launch is started by operation of the accelerator pedal, calculate a feedforward component which is part of the torque to control the clutch using a rate of change over time of the target engine speed and a current engine torque, calculate a feedback component which is part of the torque to control the clutch based on a difference between the target engine speed and the current engine speed, calculate a compensation torque using a current engine torque and an estimated clutch torque which is estimated to be currently transferred by the clutch, and control a clutch actuator to drive the clutch with a sum of the feedforward component, the feedback component, and the compensation torque.

Furthermore, according to embodiments of the present disclosure, a non-transitory computer readable medium containing program instructions for performing a launch control method for a vehicle with a dry-type clutch includes: program instructions that determine a target engine speed corresponding to an operation amount of an accelerator pedal of the vehicle when vehicle launch is started by operation of the accelerator pedal; program instructions that calculate a feedforward component which is part of the torque to control the clutch using a rate of change over time of the target engine speed and a current engine torque; program instructions that calculate a feedback component which is part of the torque to control the clutch based on a difference between the target engine speed and the current engine speed; program instructions that calculate a compensation torque using a current engine torque and an estimated clutch torque which is estimated to be currently transferred by the clutch; and program instructions that control a clutch actuator to drive the clutch with a sum of the feedforward component, the feedback component, and the compensation torque.

Accordingly, in the case of launching a vehicle engaging a dry-type clutch, even if an error occurs in the T-S curve, vehicle marketability can be improved by preventing stuttering or stalling of the engine through suitable clutch control and enabling stable launch driving of the vehicle.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
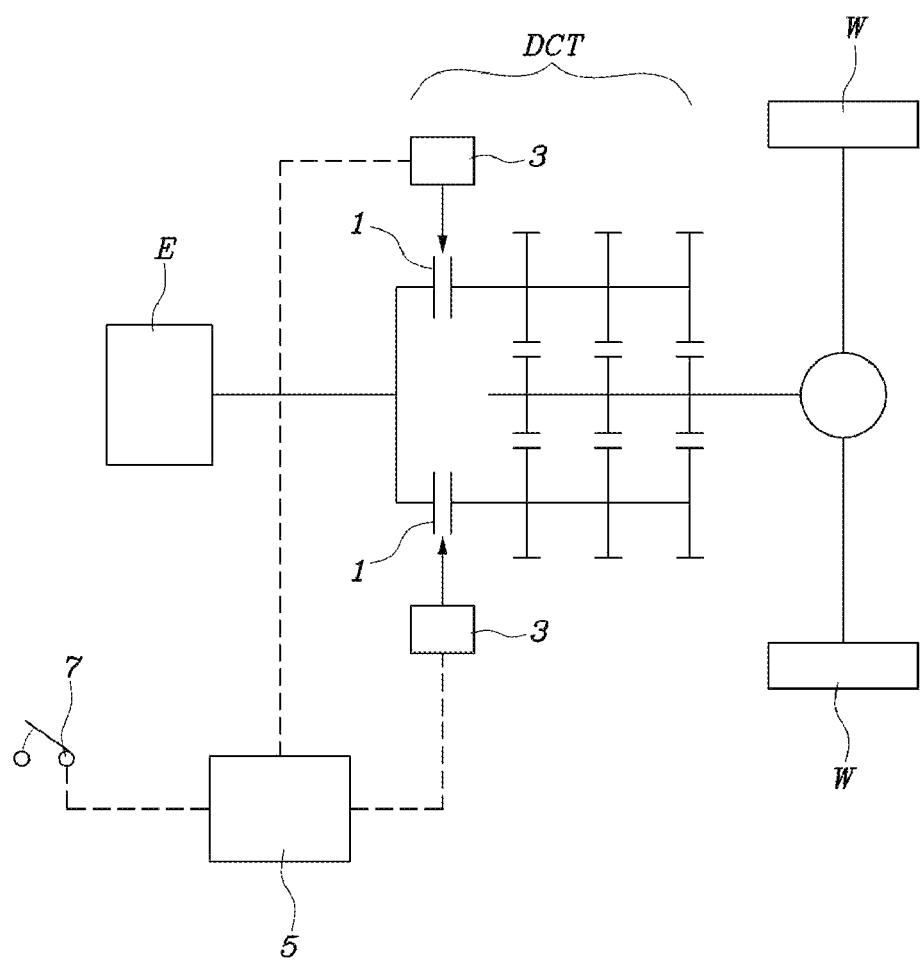
FIG. 1 is a block diagram of a vehicle equipped with DCT including two dry-type clutches to which the present disclosure can be applied.

Hereinbelow, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, in FIG. 1, the power of the engine E is adapted to be provided to drive wheels W through a Dual Clutch Transmission (DCT), two clutches 1 constituting the DCT are controlled by clutch actuators 3 respectively, the clutch actuators 3 are controlled by a controller 5, and the controller 5 is formed to receive a signal of an Accelerator Position Sensor (APS) 7 in order to be inputted an operation amount of the accelerator pedal.

Of course, the controller is also adapted to be provided with information such as engine torque, engine speed, etc.

Figure 2:
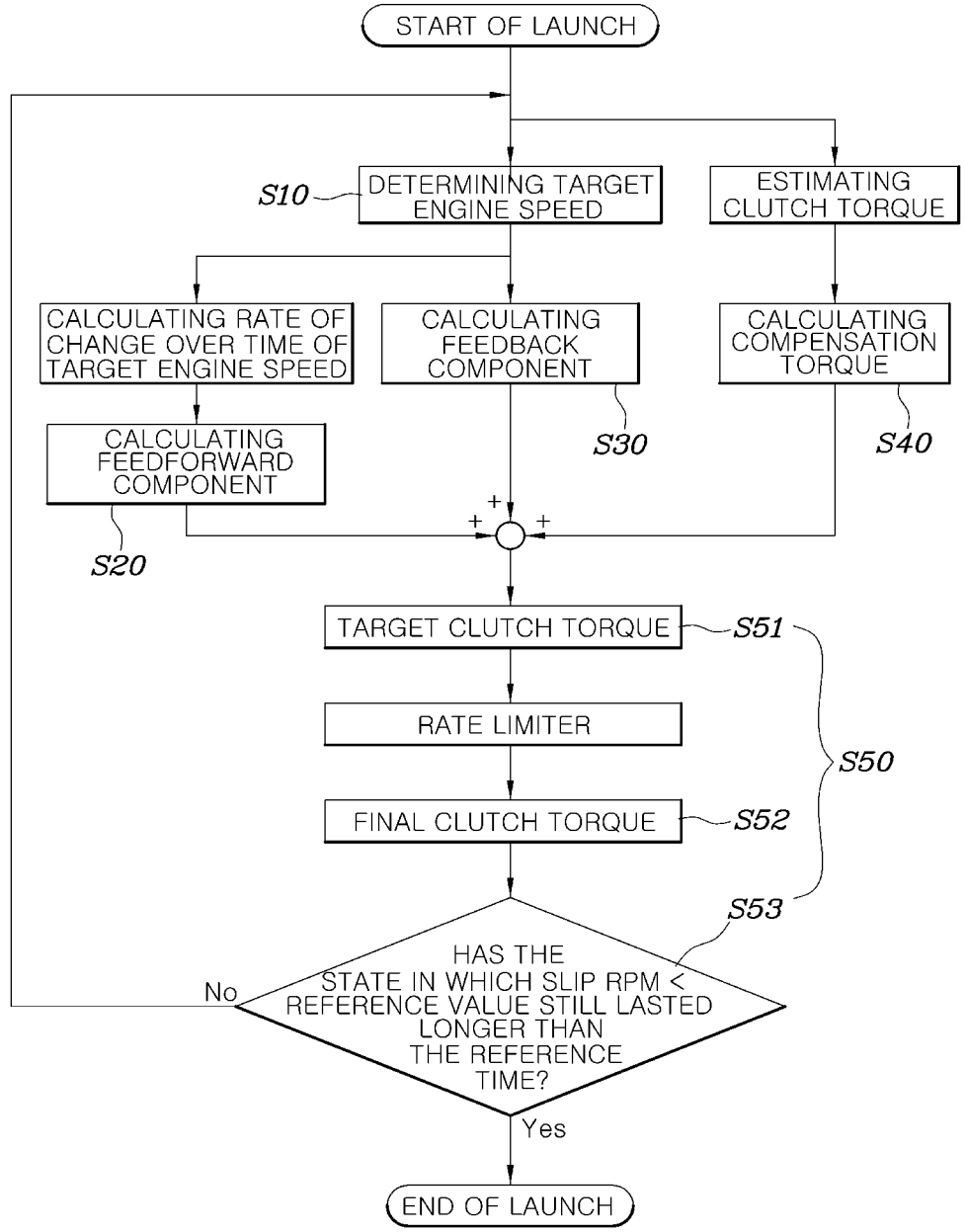
FIG. 2 is a flow chart illustrating embodiments of a launch control method according to the present disclosure.
Figure 3:
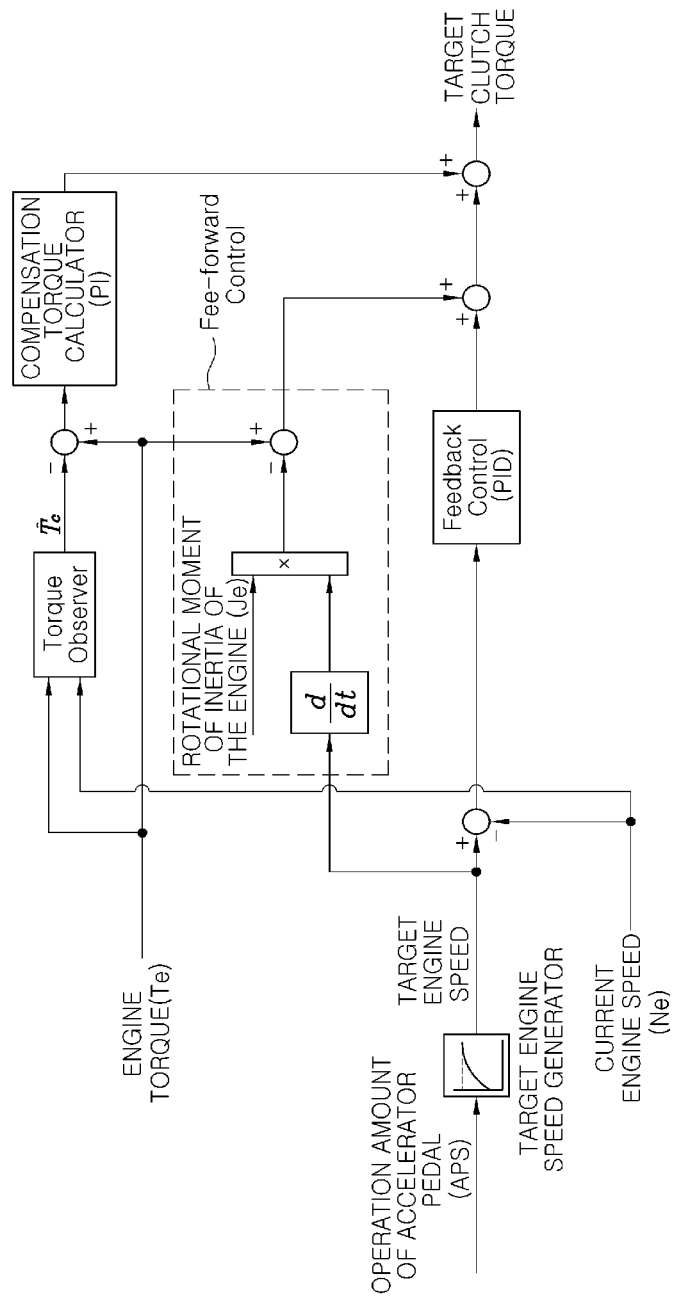
FIG. 3 is a block diagram illustrating a launch control method according to the present disclosure.

Referring to FIG. 2 and FIG. 3, embodiments of the present disclosure include: when vehicle launch is initiated by operation of the accelerator pedal by a driver, determining, by the controller 5, a target engine speed corresponding to the operation amount of the accelerator pedal at step S10; a feedforward component calculating step S20 calculating a feedforward component, which is part of the torque, to control the clutch using the rate of change over time of the target engine speed and the current engine torque; a feedback component calculating step S30, by the controller, calculating a feedback component which is part of the torque to control the clutch depending on a difference between the target engine speed and the current engine speed; a compensation torque calculation step S40, by the controller, calculating a compensation torque using the current engine torque and an estimated clutch torque, which is estimated to be currently transferred by the clutch; and a clutch control step S50, by the controller, controlling a clutch actuator driving the clutch with a sum of the feedforward component, the feedback component, and the compensation torque.

That is, when the launch control is initiated, the controller sets a target engine speed from a map on the basis of the operation amount of the accelerator pedal by driver, calculates the feedforward component for controlling the clutch based on the rate of change over time of the target engine speed and the current engine torque, calculates the feedback component through the feedback component calculating step S30, and controls the clutch via the clutch actuator, additionally considering the compensation torque calculated by the compensation torque calculation step S40 so as to ultimately control the clutch actuator.

The feedforward component calculating step calculates the feedforward component by subtracting, from the current engine torque, the product of the rate of change over time of the target engine speed and the rotational moment of inertia of the engine.

It can also be represented by the following formula.

$$T_{c\_FF} = T_e - J_e \dot{\omega}_{ed} \quad \text{[Equation 1]}$$

$T_{C\_FF}$: Feedforward component
$T_e$: Current engine torque
$J_e$: Rotational moment of inertia of the engine
$\dot{\omega}_{ed}$: Rate of change with time of the target engine speed Here, the current engine torque can be a value transmitted from a general engine controller, which calculates the torque currently being generated by the engine.

The feedforward component is equivalent to the clutch torque to ensure the desired level of launch of the vehicle according to the operation of the accelerator pedal by the driver, so that by using it by default in the clutch control, the feedforward component is responsible for the quick control of the clutch to a desired level.

The feedback component calculating step calculates a PID control value corresponding to the difference obtained by subtracting the target engine speed from the current engine speed as the feedback component.

It can also be represented by the following formula.

$$T_{c\_FB} = -K_P(\omega_e - \omega_{ed}) - K_I \int(\omega_e - \omega_{ed}) - K_D(\dot{\omega}_e - \dot{\omega}_{ed}) \quad \text{[Equation 2]}$$

$T_{c\_FB}$; Feedback component
$K_P$; Proportional control gain
$K_I$; Integral control gain
$K_D$; Differential control gain
$\omega_e$; Engine speed
$\omega_{ed}$; Target engine speed Actually, the feedback component is to serve to overcome the error occurring in proximity to the level of the clutch torque control amount desired by the feedforward component by the feedback control based on the difference between the target engine speed and the engine speed to be measured.

The compensation torque calculation step calculates a PI control value corresponding to the difference obtained by subtracting the estimated clutch torque from the current engine torque as the compensation torque.

It can also be represented by the following formula.

$$T_{c\_comp} = -K_{cp}(T_e - \hat{T}_c) - K_{ci}\int(T_e - \hat{T}_c) \quad \text{[Equation 3]}$$

$T_{c\_comp}$; Compensation torque
$K_{cp}$; Proportional control gain
$K_{ci}$; Integral control gain
$\hat{T}_c$; Estimated clutch torque The estimated clutch torque is calculated by a torque observer receiving the current engine speed and the engine torque and calculating the estimated clutch torque. This can take advantage of previously known techniques.

The estimated clutch torque can be substantially considered to be the load on the engine. Thus, for example in the case where the estimated clutch torque is greater than the current engine torque, it can be expected that the load on the engine is greater than the engine torque, so that the engine speed will be reduced.

The present disclosure is based on the characteristics as described above, whereby in the case of performing feedback control based on the difference between the engine torque and the estimated clutch torque, it is possible to always maintain or increase the engine speed, and to prevent that engine speed from being controlled the direction such that is decreases.

Accordingly, as mentioned above, the control method of the present disclosure, applying additionally the compensation torque to a clutch control amount from the feedforward component and the feedback component, serves a function of preventing stuttering of the engine, so that when the characteristics of the clutch are drastically changed, it can be used as a method of preventing engine stalling, whereby both the drivability and stability of a vehicle can ultimately be secured.

For reference, in FIG. 2, the clutch control step S50 calculates the target clutch torque by summing the feedforward component, the feedback component, and the compensation torque (S51), determines the final clutch torque by passing the torque value through a rate limiter in order to prevent the target clutch torque from changing too abruptly (S51), controls the clutch actuator using the final clutch torque, and when the state in which the slip revolutions per minute (RPM) of the clutch is less than the reference value has been maintained for longer than a reference time, determines that the engagement of the clutch is completed, and thus that the initiation of launch of the vehicle is completed (S53).

Here, the reference value for comparing the slip RPM is set for example to around 50 RPM, which is suitable because it indicates a level at which the clutch can be thought of as fully engaged. The reference time is a time during which the slip RPM is required to be stably maintained below the reference value in order to be assured that the vehicle launch has been completed. For example, the reference time will be determined in the range of a few seconds.

Although embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A launch control method for a vehicle with a dry-type clutch, comprising:
    determining, by a controller, a target engine speed corresponding to an operation amount of an accelerator pedal of the vehicle when vehicle launch is started by operation of the accelerator pedal;
    calculating, by the controller, a feedforward component which is part of the torque to control the clutch using a rate of change over time of the target engine speed and a current engine torque;
    calculating, by the controller, a feedback component which is part of the torque to control the clutch based on a difference between the target engine speed and the current engine speed;
    calculating, by the controller, a compensation torque using a current engine torque and an estimated clutch torque which is estimated to be currently transferred by the clutch; and
    controlling, by the controller, a clutch actuator to drive the clutch with a sum of the feedforward component, the feedback component, and the compensation torque.

2. The launch control method of claim 1, further comprising calculating the feedforward component by subtracting a product of the rate of change over time of the target engine speed and a rotational moment of inertia of the engine from the current engine torque.

3. The launch control method of claim 1, further comprising calculating a Proportional Integral Differential (PID) control value corresponding to a difference obtained by subtracting the target engine speed from the current engine speed as the feedback component.

4. The launch control method of claim 1, further comprising calculating a Proportional Integral (PI) control value corresponding to a difference obtained by subtracting the estimated clutch torque from the current engine torque as the compensation torque.

5. The launch control method of claim 1, further comprising calculating, by a torque observer, the estimated clutch torque according to the current engine speed and the current engine torque.

6. A launch control system, comprising:
    a vehicle with a dry-type clutch; and a controller configured to:
- determine a target engine speed corresponding to an operation amount of an accelerator pedal of the vehicle when vehicle launch is started by operation of the accelerator pedal,
- calculate a feedforward component which is part of the torque to control the clutch using a rate of change over time of the target engine speed and a current engine torque,
- calculate a feedback component which is part of the torque to control the clutch based on a difference between the target engine speed and the current engine speed,
- calculate a compensation torque using a current engine torque and an estimated clutch torque which is estimated to be currently transferred by the clutch, and
- control a clutch actuator to drive the clutch with a sum of the feedforward component, the feedback component, and the compensation torque.

7. A non-transitory computer readable medium containing program instructions for performing a launch control method for a vehicle with a dry-type clutch, the computer readable medium comprising:
- program instructions that determine a target engine speed corresponding to an operation amount of an accelerator pedal of the vehicle when vehicle launch is started by operation of the accelerator pedal;
- program instructions that calculate a feedforward component which is part of the torque to control the clutch using a rate of change over time of the target engine speed and a current engine torque;
- program instructions that calculate a feedback component which is part of the torque to control the clutch based on a difference between the target engine speed and the current engine speed;
- program instructions that calculate a compensation torque using a current engine torque and an estimated clutch torque which is estimated to be currently transferred by the clutch; and
- program instructions that control a clutch actuator to drive the clutch with a sum of the feedforward component, the feedback component, and the compensation torque.

* * * * *